(12) United States Patent
Maity et al.

(10) Patent No.: US 9,529,410 B2
(45) Date of Patent: *Dec. 27, 2016

(54) SERVICE PROCESSOR (SP) INITIATED DATA TRANSACTION WITH BIOS UTILIZING POWER OFF COMMANDS

(71) Applicant: AMERICAN MEGATRENDS, INC., Norcross, GA (US)

(72) Inventors: Sanjoy Maity, Snellville, GA (US); Purandhar Nallagatla, Johns Creek, GA (US); Harikrishna Doppalapudi, Norcross, GA (US); Ramakoti Reddy Bhimanadhuni, Suwanee, GA (US); Satheesh Thomas, Norcross, GA (US); Joseprabu Inbaraj, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 305 days.

This patent is subject to a terminal disclaimer.

(21) Appl. No.: 14/330,101

(22) Filed: Jul. 14, 2014

(65) Prior Publication Data
US 2016/0011646 A1 Jan. 14, 2016

(51) Int. Cl.
*G06F 1/32* (2006.01)
*G06F 9/44* (2006.01)
(Continued)

(52) U.S. Cl.
CPC .......... *G06F 1/3287* (2013.01); *G06F 9/4401* (2013.01); *G06F 9/442* (2013.01); *G06F 9/54* (2013.01);
(Continued)

(58) Field of Classification Search
CPC ............ G06F 9/44; G06F 9/48; G06F 9/4812; G06F 9/4806; G06F 9/441; G06F 13/32
See application file for complete search history.

(56) References Cited

U.S. PATENT DOCUMENTS 5,845,134 A * 12/1998 Arai ...................... G06F 9/4418
712/43
6,081,902 A * 6/2000 Cho ......................... G06F 1/26
713/330
(Continued)

*Primary Examiner* — Jaweed A Abbaszadeh
*Assistant Examiner* — Brian J Corcoran
(74) *Attorney, Agent, or Firm* — Locke Lord LLP; Tim Tingkang Xia, Esq.

(57) ABSTRACT

Certain aspects direct to systems and methods to perform service processor (SP) initiated data transaction with a host computer utilizing power off commands. In certain embodiments, the system includes a SP, which includes a processor, a non-volatile memory and a communication interface. The SP generates a first power off command for a data transaction purpose, and sends the first power off command to the host computer to initiate a data transaction. The OS, in response to the first power off command, calls an Advanced Configuration and Power Interface (ACPI) Machine Language (AML) code, which execute a system management interface (SMI) handler at the CPU to enter a system management mode (SMM). The SMI handler then sends a notification to the SP via the communication interface. In response to receiving the notification from the SMI handler, the SP starts performing the data transaction with the host computer.

15 Claims, 8 Drawing Sheets

(51) Int. Cl.
  *G06F 12/02* (2006.01)
  *G06F 9/54* (2006.01)
(52) U.S. Cl.
  CPC ... *G06F 12/0246* (2013.01); *G06F 2212/7202* (2013.01)

(56) References Cited

U.S. PATENT DOCUMENTS

| | | | | |
|---|---|---|---|---|
| 2003/0135534 A1* | 7/2003 | Nalawadi | ............... | G06F 9/4812 718/100 |
| 2004/0250149 A1* | 12/2004 | Tsai | ............... | G06F 1/26 713/330 |
| 2005/0086547 A1* | 4/2005 | Kobayashi | ............ | G06F 9/4812 713/310 |
| 2005/0223245 A1* | 10/2005 | Green | ............... | G06F 1/26 713/300 |
| 2006/0143209 A1* | 6/2006 | Zimmer | ............... | G06F 8/67 |
| 2007/0011507 A1* | 1/2007 | Rothman | ............ | G06F 11/2736 714/718 |
| 2008/0091962 A1* | 4/2008 | Cepulis | ............... | G06F 1/3203 713/320 |
| 2009/0049221 A1* | 2/2009 | Rangarajan | ............ | G06F 13/24 710/268 |
| 2009/0320128 A1* | 12/2009 | Pant | ............... | G06F 21/554 726/22 |
| 2011/0138082 A1* | 6/2011 | Khatri | ............... | G06F 13/24 710/8 |
| 2012/0173899 A1* | 7/2012 | Swindell | ............ | G06F 1/266 713/310 |
| 2014/0173152 A1* | 6/2014 | Kegel | ............... | G06F 13/24 710/269 |
| 2014/0289436 A1* | 9/2014 | Lewis | ............... | G06F 13/24 710/260 |
| 2014/0289570 A1* | 9/2014 | Lewis | ............... | G06F 11/3089 714/43 |

* cited by examiner

SERVICE PROCESSOR (SP) INITIATED DATA TRANSACTION WITH BIOS UTILIZING POWER OFF COMMANDS

FIELD

The present disclosure relates generally to data transaction between a basic input/output system (BIOS) of a host computer and a service processor (SP), and particularly to SP initiated data transaction with the BIOS of a host computer utilizing power off commands.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The Basic Input/Output System (BIOS) is one of the most crucial components on a computer motherboard. The BIOS software is preloaded into a memory (the BIOS memory) of the BIOS, and typically is the first code run by a computer when powered on. When the computer starts up, the first job for the BIOS is the power-on self-test, which initializes and identifies the system devices such as the CPU, RAM, video display card, keyboard and mouse, hard disk drive, optical disc drive and other hardware. The BIOS then locates a boot loader software held on a peripheral device (designated as a "boot device"), such as a hard disk or a CD/DVD, and loads and executes that software, giving it control of the operating system (OS). This process is known as booting, or booting up, which is short for bootstrapping.

Generally, a service processor (SP) or a baseboard management controller (BMC) refers to a specialized microcontroller that manages the interface between system management software and platform hardware. The BMC can be embedded on the motherboard of a computer, generally a server. For example, different types of sensors can be built into the computer system, and the BMC reads these sensors to obtain parameters such as temperature, cooling fan speeds, power status, operating system (OS) status, etc. The BMC monitors the sensors and can send alerts to a system administrator via the network if any of the parameters do not stay within preset limits, indicating a potential failure of the system. The administrator can also remotely communicate with the BMC to take some corrective action such as resetting or power cycling the system to get a hung OS running again.

In a host computer provided with a SP, the SP can be connected with the host computer via system interfaces, such as a standardized interface under an Intelligent Platform Management Interface (IPMI) standard, a universal serial bus (USB) interface or any other interfaces. The BIOS of the host computer, when needed, can initiate a communication with the SP through the interfaces using the IPMI original equipment manufacturer (OEM) commands. In other words, the BIOS can initiate data transactions to transfer data to the SP or to request data from the SP. However, the SP has to wait for the BIOS to initiate such data transactions to transfer data to the BIOS or to receive data from the BIOS. There is a need for the SP to initiate data transactions with the BIOS of the host computer.

Therefore, an unaddressed need exists in the art to address the aforementioned deficiencies and inadequacies.

SUMMARY

Certain aspects of the present disclosure direct to a system, which includes a service processor (SP). In certain embodiments, the SP includes a processor, a non-volatile memory and a communication interface. The non-volatile memory stores computer executable code configured to, when executed at the processor, generate a first power off command, and send the first power off command to a host computer; receive, via the communication interface, a notification from a system management interface (SMI) handler executed under a system management mode (SMM) at a central processing unit (CPU) of the host computer; and in response to the notification, perform data transaction between the SP and the host computer.

In certain embodiments, the communication interface is a standardized interface under an Intelligent Platform Management Interface (IPMI) standard, where the standardized interface comprises a keyboard controller style (KCS) interface, a system management interface chip (SMIC) interface, and a block transfer (BT) interface. In certain embodiments, the communication interface is a universal serial bus (USB) interface.

In certain embodiments, the SP is a baseboard management controller (BMC).

In certain embodiments, the first power off command is sent to the host computer through a communication link different from the communication interface.

In certain embodiments, the host computer includes: the CPU; a volatile memory, including a system management random access memory (SMRAM) area and a flag register; a BIOS chip storing a basic input/output system (BIOS), an Advanced Configuration and Power Interface (ACPI) Machine Language (AML) code, and the SMI handler; and a storage device storing an operating system (OS). The BIOS, when executed at the CPU, is configured to load the SMI handler into the SMRAM area; load the AML code into the volatile memory; and load the OS into the volatile memory, and execute the OS at the CPU. The OS, when executed at the CPU, is configured to receive the first power off command or a second power off command; and in response to receiving the first power off command or the second power off command, execute the AML code at the CPU. The AML code, when executed at the CPU, is configured to generate a SMI to instruct the CPU to enter the SMM; and check a value of the flag register in the memory to determine whether the data transaction between the SP and the host computer has been performed or not. The SMI handler, when executed at the CPU, is configured to generate the notification, and send the notification to the SP via the communication interface; and perform the data transaction between the SP and the host computer, and update the value of the flag register to indicate that the OS received the first power off command.

In certain embodiments, the value of the flag register is selected from a first value indicating the OS received the first power off command and a second value indicating the OS received the second power off command.

In certain embodiments, the AML code, when executed at the CPU, is further configured to: in response to determining the OS received the second power off command based on the value of the flag register, perform a power off operation based on the power off command.

In certain embodiments, the host computer further includes a power button, wherein the second power off command is generated by pressing the power button.

In certain embodiments, the notification is a first IPMI OEM message.

In certain embodiments, the code is configured to perform the data transaction by: in response to the first IPMI OEM message, retrieving specific data stored in the SP, and generating a second IPMI OEM message comprising the specific data; and sending, via the communication interface, the second IPMI OEM message to the SMI handler executed under the SMM at the CPU of the host computer. In certain embodiments, the SMI handler, when executed at the CPU, is configured to perform the data transaction by: receiving, via the communication interface, the second IPMI OEM message from the SP; and retrieving the specific data from the second IPMI OEM message.

In certain embodiments, the code is further configured to perform the data transaction by: in response to the first IPMI OEM message, sending, via the communication interface, a data transaction request to the BIOS executed under the SMM at the CPU of the host computer; and receiving, via the communication interface, a response to the data transaction request from the SMI handler executed under the SMM at the CPU of the host computer, wherein the response comprises specific data requested by the data transaction request. In certain embodiments, the SMI handler, when executed at the CPU, is configured to perform the data transaction by: receiving, via the communication interface, the data transaction request from the SP; retrieving the specific data based on the data transaction request, and generate the response with the specific data; and sending, via the communication interface, the response to the SP. In certain embodiments, the data transaction request is a third IPMI OEM message, and the response is a fourth IPMI OEM message comprising the specific data.

Certain aspects of the present disclosure direct to a method of performing data transaction between a service processor (SP) and a host computer, including: generating, by the SP, a first power off command for a data transaction purpose, and send the first power off command to the host computer; receiving, at the SP via the communication interface, a notification from a system management interface (SMI) handler executed under a system management mode (SMM) at a central processing unit (CPU) of the host computer; and in response to the notification, performing, by the SP, data transaction with the host computer.

In certain embodiments, the first power off command is sent to the host computer through a communication link different from the communication interface.

In certain embodiments, the method further includes: loading, at the host computer, a basic input/output system (BIOS) from a BIOS chip of the host computer, and executing the BIOS at the CPU; loading, by the BIOS executed at the CPU, the SMI handler from the BIOS chip into a system management random access memory (SMRAM) area into a volatile memory of the host computer; loading, by the BIOS executed at the CPU, an Advanced Configuration and Power Interface (ACPI) Machine Language (AML) code from the BIOS chip into the volatile memory; loading, by the BIOS executed at the CPU, the OS into the volatile memory, and execute the OS at the CPU; receiving, by the OS executed at the CPU, the first power off command or a second power off command; in response to receiving the first power off command or the second power off command, executing the AML code at the CPU; generating, by the AML code executed at the CPU, a SMI to instruct the CPU to enter the SMM; sending, by the SMI handler executed at the CPU, the notification to the SP via the communication interface; generating, by the SMI handler executed at the CPU, the notification, and sending the notification to the SP via the communication interface; and performing, by the SMI handler executed at the CPU, the data transaction between the SP and the host computer, and updating a value of a flag register in the volatile memory to indicate that the OS received the first power off command; and checking, by the AML code executed at the CPU, the value of the flag register to determine whether the OS received the first power off command or received the second power off command.

In certain embodiments, the method further includes: in response to determining the OS received the second power off command based on the value of the flag register, performing, by the AML code executed at the CPU, a power off operation based on the second power off command.

In certain embodiments, the value of the flag register is selected from a first value indicating the OS received the first power off command and a second value indicating the OS received the second power off command.

Certain aspects of the present disclosure direct to a non-transitory computer readable medium storing computer executable code. The code, when executed at a processor of a service processor (SP), is configured to generate, at the SP, a first power off command, and send the first power off command to a host computer; receive, at the SP via a communication interface, a notification from a system management interface (SMI) handler executed under a system management mode (SMM) at a central processing unit (CPU) of a host computer; and in response to the notification, perform, at the SP, data transaction with the host computer.

In certain embodiments, the first power off command is sent to the host computer through a communication link different from the communication interface.

In certain embodiments, the host computer includes: the CPU; a volatile memory, including a system management random access memory (SMRAM) area and a flag register; a BIOS chip storing a basic input/output system (BIOS), an Advanced Configuration and Power Interface (ACPI) Machine Language (AML) code, and the SMI handler; and a storage device storing an operating system (OS). The BIOS, when executed at the CPU, is configured to load the SMI handler into the SMRAM area; load the AML code into the volatile memory; and load the OS into the volatile memory, and execute the OS at the CPU. The OS, when executed at the CPU, is configured to receive the first power off command or a second power off command; and in response to receiving the first power off command or the second power off command, execute the AML code at the CPU. The AML code, when executed at the CPU, is configured to generate a SMI to instruct the CPU to enter the SMM; and check a value of the flag register in the memory to determine whether the data transaction between the SP and the host computer has been performed or not. The SMI handler, when executed at the CPU, is configured to generate the notification, and send the notification to the SP via the communication interface; and perform the data transaction between the SP and the host computer, and update the value of the flag register to indicate that the OS received the first power off command.

In certain embodiments, the AML code, when executed at the CPU, is configured to perform, in response to determining the OS received the second power off command based on the value of the flag register, a power off operation based on the second power off command. In certain embodiments, the value of the flag register is selected from a first value indicating the OS received the first power off command and a second value indicating the OS received the second power off command.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
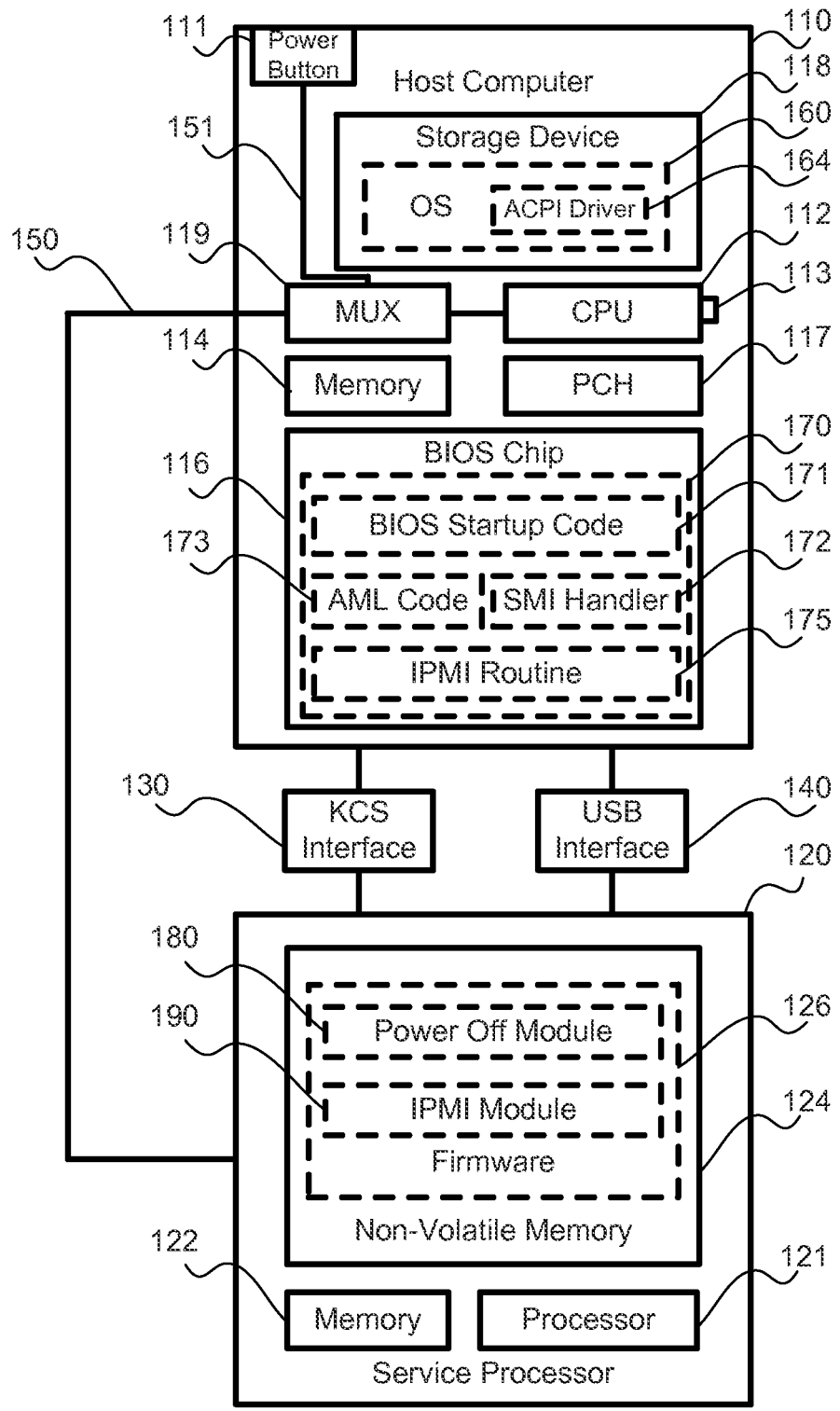
FIG. 1 schematically depicts a computer system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

FIG. 1 schematically depicts a computer system according to certain embodiments of the present disclosure. As shown in FIG. 1, the computer system 100 includes a host computer 110 and a service processor (SP) 120. The SP 120 is connected to the host computer 110 via at least one communication interface, such as a keyboard controller style (KCS) interface 130 and a universal serial bus (USB) interface 140.

In certain embodiments, the SP 120 may be connected to the host computer 110 via only one of the KCS interface 130 and the USB interface 140 as the communication interface. For example, the SP 120 may be connected to the host computer 110 via only the KCS interface 130, or via only the USB interface 140.

In certain embodiments, the SP 120 may be connected to the host computer 110 via one or more communication interfaces replacing or in addition to the KCS interface 130 and the USB interface 140. For example, the SP 120 may be connected to the host computer 110 via other typical standardized IPMI system interfaces, such as a system management interface chip (SMIC) interface or a block transfer (BT) interface. In certain embodiments, the SMIC interface and/or the BT interface can be used to replace one or both of the KCS interface 130 and the USB interface 140. In certain embodiments, data transfer between the host computer 110 and the SP 120 is in the format of IPMI OEM messages, and goes through one of the KCS interface 130 and the USB interface 140.

Further, in certain embodiments, the SP 120 may be connected to certain components of the host computer 110 directly through interfaces in addition to the KCS interface 130 and the USB interface 140. For example, the SP 120 may be connected to a multiplexer (MUX) 119 of the host computer 110 via a communication link 150. In certain embodiments, the communication link 150 can be a connecting wire, such as a general-purpose input/output (GPIO) wire.

The host computer 110 may be a computing device, such as a general purpose computer or a headless computer. Generally, the host computer 110 includes a baseboard or the "motherboard" (not shown). The baseboard is a printed circuit board to which a multitude of components or devices may be connected by way of a system bus or other electrical communication paths. Although not explicitly shown in FIG. 1, the components on the baseboard are interconnected, and the layout of the components on the baseboard and the manner of the interconnection between the components on the baseboard is herein referred to as the configuration of the baseboard. One of ordinary skill in the art would appreciate that the configuration of the baseboard may be adjusted or changed according to the necessary design or manufacturing requirements.

The components on the baseboard of the host computer 110 include, but not limited to, a central processing unit (CPU) 112, a memory 114, a BIOS chip 116, a platform controller hub (PCH) hardware 117, a MUX 119, and other required memory and Input/Output (I/O) modules (not shown). In certain embodiments, the SP 120 may also be a component on the baseboard. In certain embodiments, the CPU 112, the memory 114, and the BIOS chip 116 may be embedded on the baseboard, or may be connected to the baseboard through at least one interface. In certain embodiments, the interface may be physical hardware interface such as electrical connectors, buses, ports, cables, terminals, or other I/O devices.

Further, the host computer 110 includes a power button 111, which is connected to the MUX 119. The host computer 110 also includes a storage device 118, which stores a plurality of software applications, including an operating system (OS) 160 IPMI routine 175. In certain embodiments, the host computer 110 may include at least one I/O device (not shown) for generating and controlling input and output signals of the host computer 110. Examples of the I/O device include keyboards, touch pads, mouse, microphones, display screens, touch screens, or other I/O devices applicable for the host computer 110. Some I/O devices, such as touch screens, are provided for the dual input/output purposes.

The power button 111 is a hardware button to generate a power off command. When a user of the host computer 110 presses the power button 111, the circuits of the power button 111 generates a power off command and sends the power off command to the MUX 119 through a communication link 151. In certain embodiments, the communication link 151 can be a connecting wire.

The CPU 112 is a host processor which is configured to control operation of the host computer 110. In certain embodiments, the CPU 112 includes a plurality of registers. The host processor can execute the OS 160 or other applications of the host computer 110. In certain embodiments, the host computer 110 may run on or more than one CPU as the host processor, such as two CPUs, four CPUs, eight CPUs, or any suitable number of CPUs.

In certain embodiments, the CPU 112 is configured to receive an interrupt, which is an asynchronous signal indicating the need for attention or a synchronous event in software indicating the need for a change in execution. Interrupts are a commonly used technique for computer multitasking, especially in real-time computing. Generally, an interrupt can be either a hardware interrupt or a software interrupt. The hardware interrupt causes the CPU 112 to save its state of execution in the memory 114 and begin execution of an interrupt handler. The software interrupt is usually implemented as an instruction in an instruction set, which cause a context switch to an interrupt handler similar to a hardware interrupt.

Commonly used hardware interrupts can be categorized into, but not limited to, a maskable interrupt, a non-maskable interrupt (NMI), an inter-processor interrupt (IPI), and a spurious interrupt. The maskable interrupt, sometimes referred to as an interrupt request (IRQ), is a hardware interrupt that may be ignored by setting a bit in an interrupt mask register's (IMR) bit-mask. The NMI is a hardware interrupt that lacks an associated bit-mask, so that it can never be ignored. The IPI is a special case of interrupt that is generated by one processor to interrupt another processor in a multiprocessor system. The spurious interrupt is a hardware interrupt that is unwanted, and is typically generated by system conditions such as electrical interference on an interrupt line or through incorrectly designed hardware.

One of the hardware interrupts is the system management interrupts (SMIs). The SMI is used for system management tasks, or for offering extended functionality, such as legacy hardware device emulation. The SMI is similar to the NMI in that they both use a special electrical signaling line directly into the CPU 112, and are generally not able to be masked.

In certain embodiments, the CPU 112 can operate in a protected mode or a real mode, which is a native operating mode of the processor, or in a system management mode (SMM). SMM is a special purpose operating mode provided for handling system-wide functions like power management, system hardware control, or proprietary OEM-designed code. The SMM is intended for use only by system firmware, not by applications software or general-purpose systems software. The main benefit of SMM is that it offers a distinct and easily isolated processor environment that operates transparently to the operating system or executive and software applications. In certain embodiments, the CPU 112 can switch from the protected mode to the SMM by receiving a SMI.

In certain embodiments, the CPU 112 has a SMI pin 113. The SMI pin 113, sometimes referred to as a SMI#, is a system hardware pin connected to the lines of the CPU 112 to trigger the CPU 112 to enter the SMM. When the SMI pin 113 receives a SMI, the SMI pin 113 triggers the CPU 112 to enter the SMM. In certain embodiments, the SMI may be a hardware SMI, which is generated by hardware components of the host computer 110. For example, the hardware SMI may be generated as described above by sending a signal through the special electrical signaling line connected to the SMI pin 113 of the CPU 112. In certain embodiments, a hardware SMI can be generated through the PCH hardware 117. In certain embodiments, the SMI may be a software SMI, which is generated by software code. For example, the CPU 112 may have a SMM register, and by writing certain values to the SMM register of the CPU 112, the CPU 112 may generate a software SMI.

In SMM, the CPU 112 switches to a separate address space of the memory 114 while saving the context of the currently running program or task. The SMM-specific code may then be executed transparently. Upon returning from the SMM to the protected mode, the CPU 112 is placed back into its state prior to the SMM. Details of the SMM will be discussed later.

The memory 114 can be a volatile memory, such as the random-access memory (RAM), for storing the data and information during the operation of the host computer 110. In certain embodiments, the memory 114 is in communication with the CPU 112 through a system bus (not shown).

The PCH hardware 117 controls certain data paths and support functions used in conjunction with the CPU 112. For example, when the value of a specific register in the PCH hardware 117 is changed to a predetermined value, the PCH hardware 117 can send a signal through the special electrical signaling line connected to the SMI pin 113 of the CPU 112 to generate a hardware SMI.

The MUX 119 is a device that selects one of several analog or digital input signals and forwards the selected input into a single line. As shown in FIG. 1, the MUX 119 has two inputs and one output. One input of the MUX 119 is connected to the communication link 151, which is connected to the power button 111. The other input of the MUX 119 is connected to the communication link 150, which is connected to the SP 120. The output of the MUX is connected to another communication link, which is connected to the CPU 112. The output communication link between the MUX 119 and the CPU 112 can be for example a bus or just a connecting wire. Either one of the power button 111 and the SP 120 can send a power off command to the MUX 119. When the MUX 119 receives the power off command, the MUX 119 forwards the power off command to the CPU 112.

The BIOS chip 116 is one of the most crucial components in the host computer 110 or any computer system. In certain embodiments, the BIOS chip 116 is a non-volatile memory, such as a flash memory chip, an electrically erasable programmable read-only memory (EEPROM) chip or a complementary metal oxide semiconductor (CMOS) memory. As shown in FIG. 1, the BIOS chip 116 stores BIOS code 170 (hereinafter the BIOS 170). In certain embodiments, the BIOS 170 includes a BIOS startup code 171, an SMI handler 172, an Advanced Configuration and Power Interface (ACPI) machine language (AML) code and an IPMI routine 175.

The BIOS startup code 171 is configured to perform the startup functions, or the booting functions, for the host computer 110. Examples of the booting functions include, but are not limited to, the initiation and power-on self-test, identifying the system devices, locating the boot loader software on the boot device, loading and executing the boot loader software and giving it control of the OS 160 in the protected mode.

In certain embodiments, some or all of the components of the BIOS 170 includes functionalities required in the SMM. When the CPU 112 of the host computer 110 is triggered to enter the SMM, these components of the BIOS 170 will be loaded to a particular region of the memory 114 reserved for the SMM to perform the functionalities required in the SMM. For example, the SMI handler 172 is an interrupt handler program executed when the CPU 112 enters SMM. In certain embodiments, the SMI handler 172 can be stored in the BIOS chip 116 as a part of the BIOS 170 code. In certain embodiments, the SMI handler 172 can be stored in the storage device 118, or in any other storage media of the host computer 110, as a program independent and separated from the BIOS 170.

The AML code 173 includes computer code to perform ACPI functionalities when the BIOS 170 adopts the ACPI standard, which is an open standard for device configuration and power management by the operating system. The AML code 173 can be complied from programs written in ACPI Source Language (ASL). When the CPU 112 of the host computer 110 executes the OS 160, the executed OS 160 takes over control of the host computer 110. In certain predefined occasions, the OS 160 may call the AML code 173 provided the BIOS 170 to perform the ACPI functionalities.

In certain embodiments, one of the ACPI functionalities provided by the AML code 173 includes triggering the SMM in response to a power off command. Specifically, when the OS 160 receives a power off command, the OS 160 calls and executes the AML code 173. Then the AML code 173, executed at the CPU 112, can write a predetermined value to the SMM register 115 in the CPU 112 to trigger the SMM. Once the value of the SMM register 115 is changed, the CPU 112 automatically generates a software SMI, and enters SMM. In certain embodiments, the AML code 173, executed at the CPU 112, can write a predetermined value to a specific register in the PCH hardware 117 to trigger the SMM. Once the value of the specific register is changed, the PCH hardware 117 automatically generates a hardware SMI, and sends a signal through the special electrical signaling line connected to the CPU 112 enters SMM.

Figure 2A:
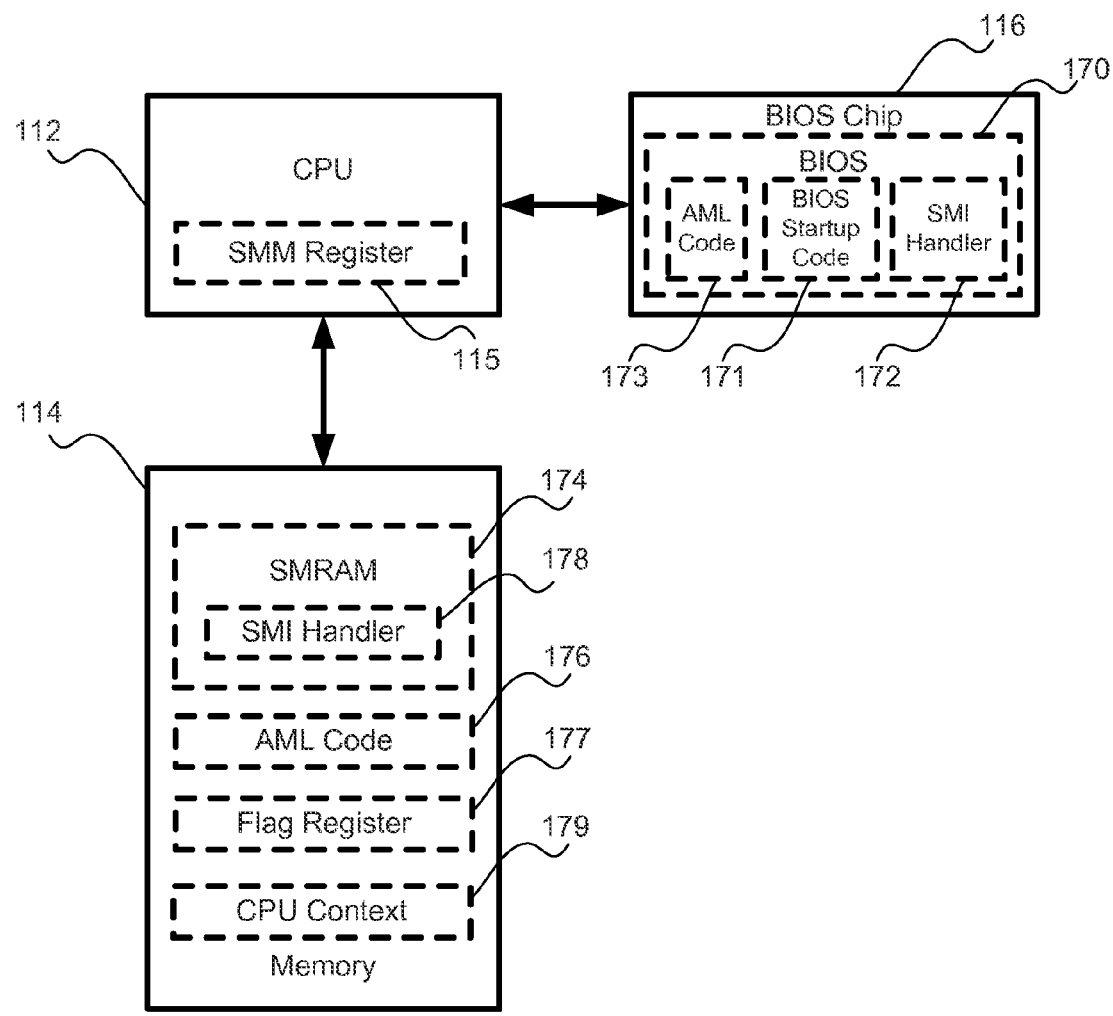
FIG. 2A schematically shows execution of the host computer in a system management mode (SMM) according to certain embodiments of the present disclosure.

FIG. 2A schematically shows execution of the host computer in the SMM according to certain embodiments of the present disclosure. As shown in FIG. 2A, the CPU 112 has a SMM register 115. The CPU 112 is in communication with the memory 114 through a system bus. The memory 114 includes a system management RAM (SMRAM) area 174, and a CPU context area 179.

The SMRAM area 174 is a particular region of the memory 114 reserved for the SMM. In certain embodiments, the BIOS 170 can set up the SMRAM area 174 for the CPU 112 during the booting process, such that the SMRAM area 174 contains a copy of the SMI handler 178.

During the booting process, the CPU 112 reads the BIOS startup code 171 from the BIOS chip 116, and loads the BIOS startup code 171 into a BIOS area (which is not in the SMRAM area 174) of the memory 114. The CPU 112 executes the BIOS startup code 171 in the memory 114 to start performing the booting operations. The BIOS startup code 171, which is executed at the CPU 112, then reads the SMI handler 172 and the AML code 173 from the BIOS chip 116, and loads the SMI handler 178 and the AML code 176 into the memory 112. The SMI handler 178 is loaded into the SMRAM area 174, and the AML code 176 is not in the SMRAM area 174. Thus, the SMI handler 178 and the AML code 176 may be available in the memory 114 for later use.

The IPMI routine 175 is a computer routine that generates and processes IPMI messages. In certain embodiments, the IPMI routine 175 may receive data from the SMI handler 178 executed in the SMM, and converts the received data to generate corresponding IPMI messages. For example, when the SMI handler 178 is running under the SMM, which is triggered by a power off command, the SMI handler 178 may generate a notification to be sent to the SP 120, and send data of the notification to the IPMI routine 175. Upon receiving the data of the notification, the IPMI routine 175 converts the data to an IPMI OEM message representing the notification, and sends the IPMI OEM message to the SP 120 through the communication interface (the KCS interface 130 or the USB interface 140). When the IPMI routine 175 receives IPMI OEM messages from the SP 120 or any other peripheral devices, the IPMI routine 175 processes the IPMI OEM messages to generate data recognizable by the SMI handler 178, and then sends the data back to the SMI handler 178 for further process.

In certain embodiments, the IPMI routine 175 can be separated from the BIOS 170 as an independent program. In certain embodiments, the IPMI routine 175 can be a part of the BIOS 170.

The IPMI messages can be transmitted, translated, bussed, and wrapped in a variety of fashions. Generally, an IPMI message can be a request message (generally labeled as "rq") or a response message (generally labeled as "rs"), and has a plurality of fields, including the network function (NetFn) field, the logical unit number (LUN) field, the sequence number (Seq#) field, the command (CMD) field, and the data field.

The NetFn field is a six-bit field that describes the network function of the IPMI message. The IPMI Specification defines certain predefined categories for the NetFn field, and there are reserved code for OEM expansion. For a request message, the NetFn field is an odd number, and for a response message, the NetFn field is an even number.

The LUN field is a two-digit logical unit number for subaddressing purposes. For low-end integrity servers and computers, the LUN field is always zero.

The Seq# field defines a sequence number in the response message to identify the response message in response to a certain request message. In certain embodiments, the value stored in the Seq# field is the same number as the sequence number appeared in the CMD field of the request message to which the response message is in response. As discussed above, the Seq# field must be provided when the NetFn field is an even number to indicate the IPMI message as a response message.

The CMD field includes the commands of the IPMI message. When the IPMI message is a request message, the CMD field includes a sequence number such that a response message to the request message may include the same sequence number in the Seq# field.

The data field includes all data transferred by the IPMI message. In certain embodiments, the data field of an IPMI message can be 0 bytes. In other words, an IPMI message may contain no data field.

Figure 2B:
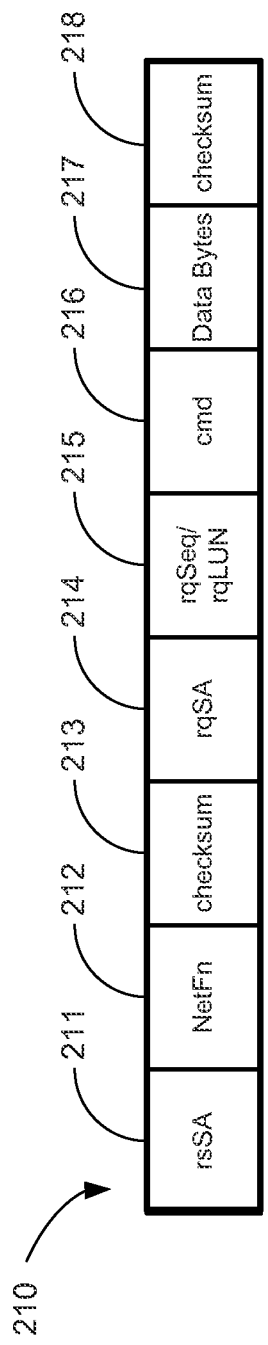
FIG. 2B schematically depicts an IPMI message according to certain embodiments of the present disclosure.

FIG. 2B schematically depicts an IPMI message according to certain embodiments of the present disclosure. As shown in FIG. 2B, each block of the IPMI message 210 refers to a field, which may have a different length. The IPMI message 210 includes a plurality of fields, such as the rs slave address (rsSA) field 211, the NetFn field 212, the rq slave address (rqSA) field 214, the rq Seq# (rqSeq)/rqLUN field 215, the command field 216, and the data field 217. Further, a plurality of checksum fields 213 and 218 are included for checksum verification purposes. As discussed above, the data field 217 may contain 0 bytes of data (i.e. no data field) or more than one byte of data.

In certain embodiments, IPMI OEM messages are used for data transaction purposes between the BIOS 170 and the SP 120. When the IPMI routine 175 processes data to be transferred to the SP 120 to generate an IPMI OEM message, the data can be stored in the data field 217 of the IPMI OEM message as shown in FIG. 2B.

The storage device 118 is a non-volatile data storage media for storing the OS 160, and other applications of the host computer 110. Examples of the storage device 118 may include flash memory, memory cards, USB drives, hard drives, floppy disks, optical drives, or any other types of data storage devices.

The OS 160 can be collective management software managing the operation of the host computer 110. For example, the OS 160 can include a set of functional programs that control and manage operations of the devices connected to the host computer 110. The set of application programs provide certain utility software for the user to manage the host computer 110. In certain embodiments, the OS 160 is operable to multitask, i.e., execute computing tasks in multiple threads, and thus may be any of the following: MICROSOFT CORPORATION's "WINDOWS 95," "WINDOWS CE," "WINDOWS 98," "WINDOWS 2000" or "WINDOWS NT", "WINDOWS Vista,", "WINDOWS 7," and "WINDOWS 8," operating systems, IBM's OS/2 WARP, APPLE's MACINTOSH OSX operating system, LINUX, UNIX, etc. In certain embodiments, the OS 160 is compatible to the IPMI architecture for generating IPMI messages in order to communicate with the SP 120.

Figure 3:
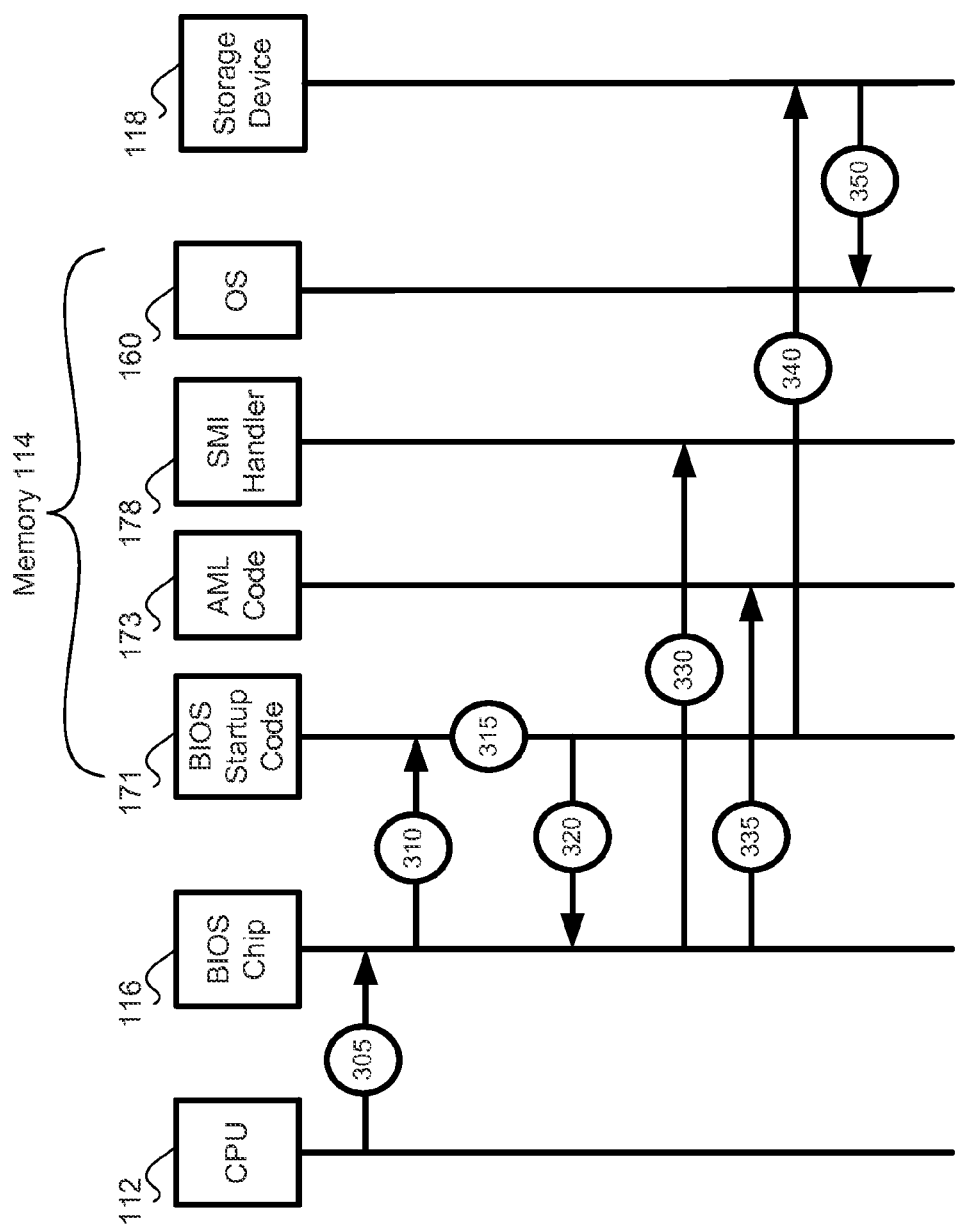
FIG. 3 schematically depicts the booting process of the host computer according to certain embodiments of the present disclosure.

FIG. 3 schematically depicts the booting process of the host computer according to certain embodiments of the present disclosure. When the host computer 110 starts booting, at procedure 305, the CPU 112 reads the BIOS startup code 171 from the BIOS chip 116, and at procedure 310, the CPU 112 loads the BIOS startup code 171 into a BIOS area of the memory 114. It should be noted that the BIOS 170 during booting is not stored in the SMRAM area 174. At procedure 315, the CPU 112 executes the BIOS startup code 171 in the memory 114 to start performing the booting operations. The BIOS startup code 171, which is executed at the CPU 112, then, at procedure 320, reads the SMI handler 172 and the AML code 173 from the BIOS chip 116. At procedure 330, the BIOS startup code 171 loads the SMI handler 178 into the SMRAM area 174, and at procedure 335, the BIOS startup code 171 loads the AML code 176 into the memory 114. Thus, the AML code 176 and the SMI handler 178 may be available in the memory 114 whenever needed. At procedure 340, the BIOS startup code 171, which is executed at the CPU 112, reads the OS 160 from the storage device 118, and at procedure 350, loads the OS 160 into the memory 114, and gives control of the CPU 112 to the executed OS 160.

In certain embodiments, the OS 160 is configured to receive a power off command, and, in response to the power off command, perform certain operations for the data transaction between the SP 120 and the host computer 110. In certain embodiments, the OS 160 may adopt the ACPI standard in order to call the AML code 173 in response to the power off command. The ACPI specification provides an open standard for device configuration and power management by the OS 160. In certain embodiments, the OS 160 may include an ACPI driver 164 to call the AML code 173 to perform the device configuration and power management under the ACPI standard.

The SP 120 is a specialized microcontroller that manages the interface between system management software and platform hardware. In certain embodiments, the SP 120 may be a baseboard management controller (BMC). Different types of sensors can be built into the host computer 110, and the SP 120 reads these sensors to obtain parameters such as temperature, cooling fan speeds, power status, OS status, etc.

The SP 120 monitors the sensors and can send out-of-band (OOB) alerts to a system administrator of the host computer 110 if any of the parameters do not stay within preset limits, indicating a potential failure of the host computer 110. In certain embodiments, the administrator can also remotely communicate with the SP 120 from a remote management computer via a network to take remote action to the host computer. For example, the administrator may reset the host computer 110 from the remote management computer through the SP 120, and may obtain system information of the host computer 110 OOB without interrupting the operation of the host computer 110.

As shown in FIG. 1, the SP 120 includes a processor 121, a memory 122 and a non-volatile memory 124. In certain embodiments, the SP 120 is also connected to the CPU 112 of the host computer 110 through a hard wire. In certain embodiments, the SP 120 may include other components, such as at least one I/O device (not shown).

The processor 121 controls operation of the SP 120. The processor 121 can execute the firmware 126 or other code stored in the SP 120. In certain embodiments, the SP 120 may run on or more than one processor.

The memory 122 can be a volatile memory, such as the RAM, for storing the data and information during the operation of the SP 120.

The non-volatile memory 124 stores the firmware 126 of the SP 120. The firmware 126 of the SP 120 includes computer executable code for performing the operation of the SP 120. As shown in FIG. 1, the firmware 126 of the SP 120 includes, among other things, an power off module 180 and an IPMI module 190. In certain embodiments, the firmware 126 may include a web connection module (not shown) for communication with the network such that the administrator of the computer system may connect to the SP 120 remotely from the remote management computer via the network.

The power off module 180 is a program configured to generate power off commands for the OS 160 of the host computer 110 to initiate the data transactions between the BIOS 170 and the SP 120. In certain embodiments, when the SP 120 intends to initiate a data transaction with the BIOS 170 of the host computer 110, the firmware 126 may instruct the power off module 180 to generate a power off command, and sends the power off command to the host computer 112 through the communication link 150.

The IPMI module 190 is a program of the SP 120 to generate and process IPMI messages. In certain embodiments, when the firmware 126 of the SP 120 generates data to be transferred to the host computer 110 under the IPMI architecture, the firmware 126 sends the data to the IPMI module 190. Upon receiving the data, the IPMI module 190 converts the data to corresponding IPMI OEM messages, and sends the IPMI OEM messages back to the host computer 110 through the communication interface, such as the KCS interface 130 or the USB interface 140. When the IPMI module 190 receives IPMI OEM messages from the host computer 110 or any other IPMI compatible devices, the IPMI module 190 processes the IPMI OEM messages to generate data recognizable by the firmware 126, and then sends the data back to the firmware 126 for further process. In certain embodiments, the IPMI module 190 can be a similar program to the IPMI routine 175 at the host computer 110.

Currently, almost all firmware of SP's or BMC's available in the market supports the IPMI architecture, and provide a variety of IPMI modules 190. In certain embodiments, the IPMI module 190 can be a part of the firmware 126, which is compatible to the IPMI architecture for generating IPMI messages. In certain embodiments, the IPMI module 190 is separated from the firmware 126 as an independent program.

In certain embodiments, IPMI OEM messages are used for data transaction purposes between the BIOS 170 and the SP 120. When the IPMI module 190 processes data to be transferred to the host computer 110 to generate an IPMI OEM message, the data can be stored in the data field 217 of the IPMI OEM message as shown in FIG. 2B.

The KCS interface 130 is a standardized interface often used between a SP and a payload processor in the IPMI architecture. IPMI is an industry standard for system monitoring and event recovery. The IPMI specification provides a common message-based interface for accessing all of the manageable features in a compatible computer. IPMI includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a SP through an operating system or through an external connection, such as through a network or serial connection. Additional details regarding IPMI can be found in the IPMI Specification (Version 2.0), which is publicly available from INTEL CORPORATION, and which is incorporated herein by reference.

In certain embodiments, in addition to the standard predefined commands and parameters, IPMI allows original equipment manufacturer (OEM) extensions for the manufacturers and users to define OEM specific commands. A user may use IPMI OEM messages to control data transmission via the KCS interface 130. The IPMI OEM messages may be used for the data transaction between the host computer 110 and the SP 120. In certain embodiments, the IPMI OEM messages may include the specific data to be transferred, or the request for the specific data.

The USB interface 140 is an industry standardized interface under the USB industry standard that defines the cables, connectors and communications protocols used in a bus for connection, communication, and power supply between computers and electronic devices. In certain embodiments, the USB interface 140 is a USB port.

USB has effectively replaced a variety of earlier interfaces, such as serial and parallel ports, as well as separate power chargers for portable devices. Currently, USB allows bi-directional communications between the host computer 110 and the SP 120, as USB 3.0 allows for device-initiated communications towards the host.

In certain embodiments, the USB interface 140 may be used to transfer IPMI OEM messages between the host computer 110 and the SP 120. In certain embodiments, when the SP 120 is connected to the host computer 110 via the USB interface 140, the OS 160 may request and receive a plurality of USB descriptors from the SP 120 through the USB interface 130. Based on information of the USB descriptors, the OS 160 may recognize the SP 120 as the specific USB human interface device (HID) device, and recognize a predefined format of a USB HID report for transferring data to the specific HID device (i.e. the SP 120). In certain embodiments, the USB HID report is in the predefined format based on the information of the USB descriptors with the IPMI OEM messages embedded therein. Thus, the IPMI OEM messages can be transferred between the host computer 110 and the SP 120 through the USB interface 140 by transferring the USB HID reports with the IPMI OEM messages embedded therein.

In certain embodiments, the SP 120 can initiate a data transaction with the BIOS 170 of the host computer 110 utilizing power off commands. In certain embodiments, the data transaction initiated by the SP 120 can be bi-directional between the BIOS 170 and the SP 120. For example, the BIOS 170 may have certain setting data stored in the BIOS chip 116 that can be configured by a user of the host computer 110 or by an administrator through the SP 120. In certain embodiments, for a system having a plurality of host computers 110 with similar BIOS settings, an administrator may intend to copy the setting data of the BIOS 170 from one of the host computers 110 to other computers of the system. In certain embodiments, the administrator may, through the SP 120, initiate a data transaction for a copy of the setting data of the BIOS 170. When the SMI handler 178 executed in the SMM receives such request, the SMI handler 178 may retrieve the setting data, and sends a copy of the setting data to the SP 120 such that the setting data is available at the SP 120 to be replicated to other computers in the system. In certain embodiments, the administrator may, through the SP 120, initiate a data transaction for sending the setting data from the SP 120 to the host computer 110. When the SMI handler 178 executed in the SMM receives such request, the SMI handler 178 may receive a copy of the setting data from the SP 120, and replace the setting data in the BIOS chip 116 with the received setting data.

In certain embodiments, the SP 120 can initiate a data transaction between the BIOS 170 and the SP 120 by causing the host computer 110 to enter the SMM, such that the host computer 110 performs the data transaction under the SMM. Specifically, the SP 120 may instruct the power off module 180 to generate a power off command, and sends the power off command to the host computer 110 through the communication link 150. In response to the power off command, the host computer 110 then performs operation to enter the SMM.

Figure 4A:
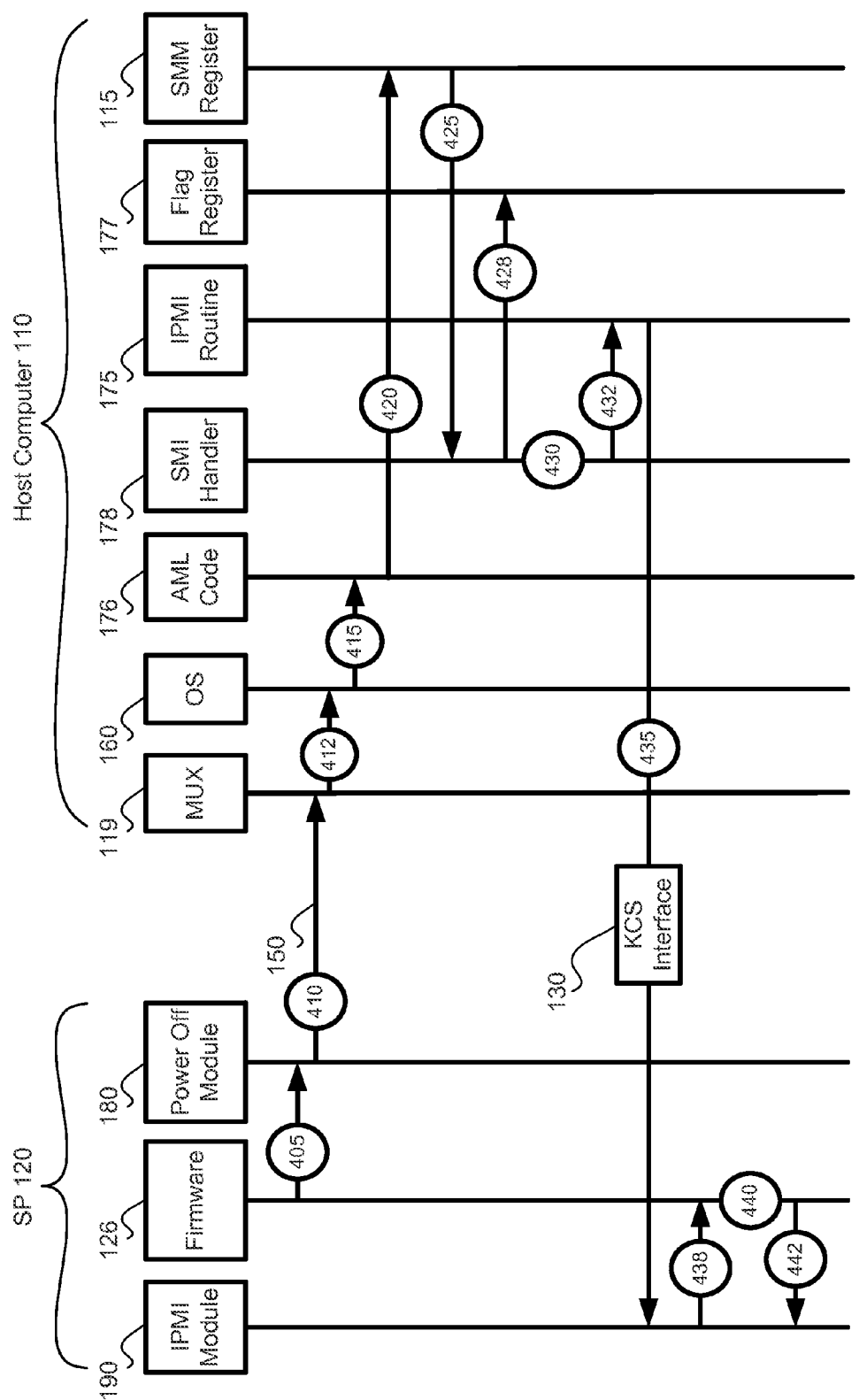
FIGS. 4A and 4B schematically depict the SP initiating data transaction from the BIOS of the host computer to the SP according to certain embodiments of the present disclosure.
Figure 4B:
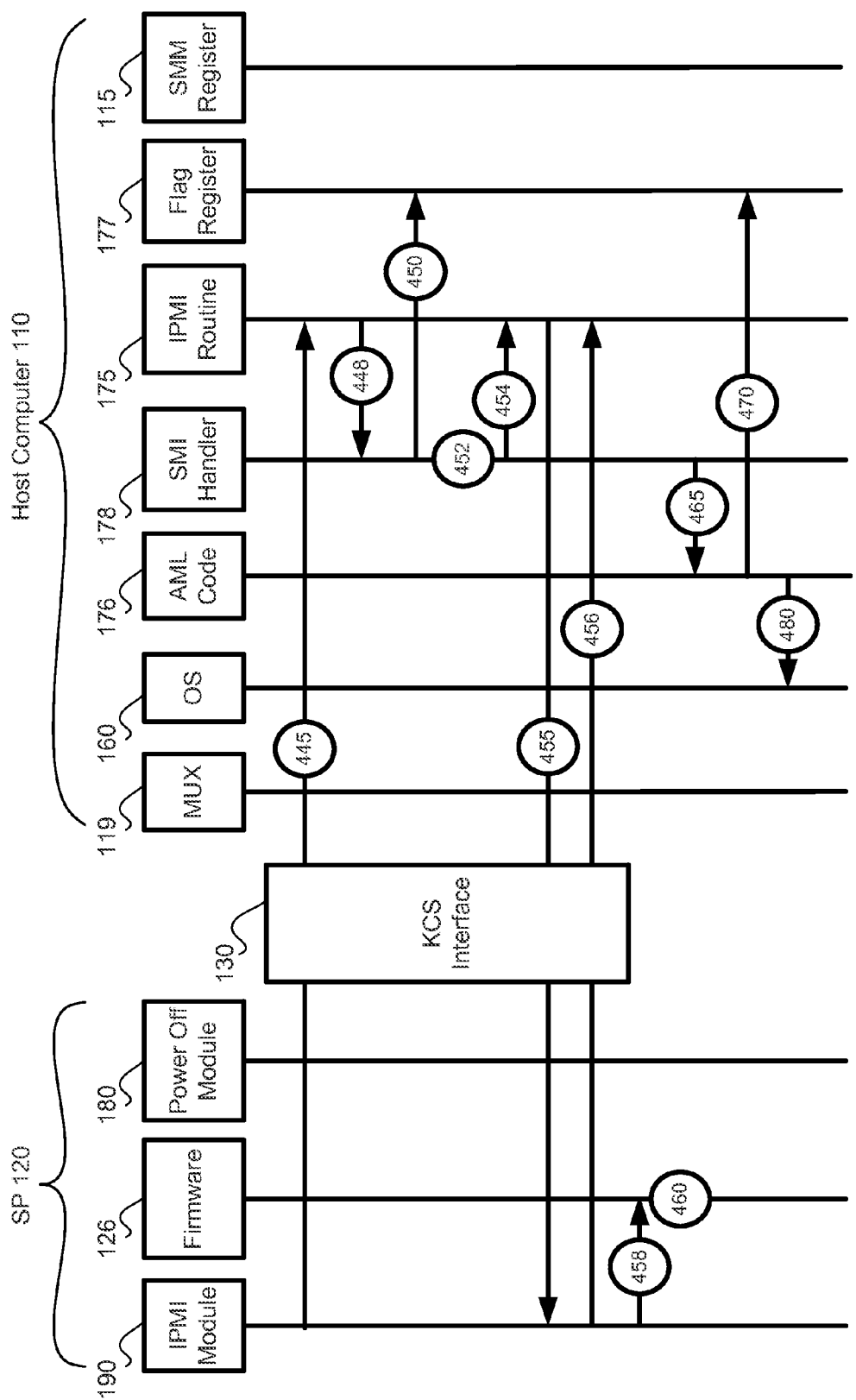

FIGS. 4A and 4B schematically depict the SP initiating data transaction from the BIOS of the host computer to the SP according to certain embodiments of the present disclosure. In certain embodiments, software SMI is used to trigger the SMI handler 178, and the data being transferred between the SMI handler 178 and the SP 120 is the setting data of the BIOS 170 stored in the BIOS chip 116.

Referring to FIG. 4A, when the SP 120 intends to request certain data from the BIOS 170 of the host computer 110, the SP 120 may initiate the data transaction from the host computer 110 to the SP 120. At procedure 405, the firmware 126 instructs the power off module 180 to generate a power off command. At procedure 410, the power off module 180 of the SP 120, upon the instruction by the firmware 126, sends a power off command to the host computer 110 through the communication link 150.

At the host computer 110, when the MUX 119 receives the power off command from the SP 120, at procedure 412, the MUX 119 forwards the power off command to the OS 160, which is executed at the CPU 112. In certain embodiments, the OS 160 may not recognize whether the power off command is issued by the SP 120 or generated by pressing the power button 110 of the host computer 110.

Upon receiving the power off command, at procedure 415, the OS 160 executed at the CPU 112 may be triggered by the power off command to call the AML code 176, which is pre-stored in the memory 114 during the booting process, and the AML code 176 takes over control of the CPU 112 from the OS 160.

At procedure 420, the AML code 176, which is executed at the CPU 112, writes a value into the SMM register 115 of the CPU 112 to generate a software SMI. At procedure 425, the CPU 112 detects the value written in the SMM register 115, and can then enter SMM. Optionally, the CPU 112 checks if the value written in the SMM register 115 matches a preset value and enters SMM if they match. Once the CPU enters SMM, it calls the SMI handler 178, which is pre-stored in the SMRAM area 174 during the booting process.

Once taking over control of the CPU 112, the SMI handler 178 must determine whether the SP 120 intends to initiate data transaction or not. At procedure 428, the SMI handler 178 initiates a flag register 177 in the memory 114. The flag register 177 is a reserved register to indicate whether the SP 120 intends to initiate the data transaction or not, and the preset value for the flag register 177 indicate that the SP 120 does not intend to initiate the data transaction. In certain embodiment, for example, the value in the flag register 177 may be a first value to indicate that SP 120 intends to initiate the data transaction, or a second value to indicate that the SP 120 does not intend to initiate the data transaction. In this case, the preset value of the flag register 177 is the second value.

At procedure 430, the SMI handler 178 generates a notification for the SP 120. The notification may contain information notifying the SP 120 that the host computer 110 is now in the SMM, and asking whether the SP 120 intends to initiate the data transaction. At procedure 432, the SMI handler 178 sends the data of the notification to the IPMI routine 175 for processing. Upon receiving the data of the notification, the IPMI routine 175 converts the data of the notification to generate the IPMI OEM message, and at procedure 435, the IPMI routine 175 sends the IPMI OEM message representing the notification to the SP 120 through the KCS interface 130. It should be appreciated that the IPMI OEM message can be sent to the SP 120 through the USB interface 140 or any other appropriate communication interfaces. In certain embodiments, the IPMI OEM message requests a response from the SP 120 to indicate whether it was the SP 120 that issued a power off command.

At procedure 438, the IPMI module 190 receives the IPMI OEM message representing the notification, converts the IPMI OEM message to generate the notification, which is recognizable by the firmware 126, and sends the notification to the firmware 126.

At procedure 440, in response to the notification, the firmware 126 generates a response to indicate whether it was the SP 120 that issued a power off command. At procedure 442, the firmware 126 sends the response to the IPMI module 190 for processing.

Referring to FIG. 4B, upon receiving the response, at procedure 445, the IPMI module 190 converts the response to generate another IPMI OEM message, and sends the IPMI OEM message representing the data transaction request to the host computer 110 through the KCS interface 130. It should be appreciated that the IPMI OEM message can be sent to the SP 120 through the USB interface 140 or any other communication interfaces. The IPMI OEM message indicates whether it was the SP 120 that issued the power off command.

At procedure 448, the IPMI routine 175 receives the IPMI OEM message representing the response, extracts the response from the IPMI OEM message. The SMI handler 178 can then determine whether it was the SP 120 that issued the power off command based on the response.

In response to a determination that it was the SP 120 that issued the power off command based on the response, at procedure 450, the SMI handler 178 updates the flag register 177 by writing a first value in the flag register 177 in the memory 114 to indicate that the SP 120 intends to initiate the data transaction.

In response to a determination that it was not the SP 120 that issued the power off command based on the response, the SMI handler 178 updates the flag register 177 by writing a second value in the flag register 177 in the memory 114 to indicate that SP 120 does not intend to initiate the data transaction as described above. In this situation, the SMI handler 178 can terminate and wait for the CPU to exit SMM. Alternatively, the SMI handler 178 may contain other pre-set routines such as those implementing Advanced Power Management (APM) features, and the SMI handler may enter and execute one or more of the other pre-set routines.

Then, in response to a determination that it was the SP 120 that issued the power off command based on the response, at procedure 452, the SMI handler 178 retrieves certain data collection (e.g., the setting data of the BIOS 170 from the BIOS chip 116) to be sent to the SP 120. At procedure 454, the SMI handler 178 sends the data to the IPMI routine 175 for processing. Upon receiving the data, the IPMI routine 175 converts the data to generate one or more IPMI OEM messages, and at procedure 455, the IPMI routine 175 sends the IPMI OEM messages having the data collection to the SP 120 through the KCS interface 130. It should be appreciated that the IPMI OEM message can be sent to the SP 120 through the USB interface 140 or any other communication interfaces.

At the SP 120, at procedure 458, the IPMI module 190 receives the IPMI OEM message representing the data collection, converts the IPMI OEM message to generate the data collection, which is recognizable by the firmware 126, and sends the data collection to the firmware 126. At procedure 460, the firmware 126 processes the requested data.

Alternatively, at procedure 455, the SMI handler 178, through the IPMI routine 175, may generate a request for data, e.g., a BIOS update, and then send the request to the SP 120. The IPMI module 190 can inform the firmware 120 to gather the requested data, construct one or more IPMI OEM responses having the requested data, and then, at procedure 456, send the one or more IPMI OEM responses to the host computer 110.

Further, at procedure 455, the SMI handler 178, through the IPMI routine 175, may generate a request to inquire the SP 120 that whether the SP 120 wishes to receive certain data from the host computer 110. The firmware 126 can, through the IPMI module 190, construct one or more IPMI OEM responses having the data request of the SP 120, and then, at procedure 456, send the one or more IPMI OEM responses to the host computer 110. The SMI handler can gather the data requested by the SP 120. The IPMI routine 175 constructs one or more IPMI OEM messages having the data requested by the SP 120. The IPMI routine 175 then sends the IPMI OEM messages to the SP 120 through the KCS interface 130. It should be appreciated that the IPMI OEM message can be sent to the SP 120 through the USB interface 140 or any other communication interfaces.

Meanwhile, at the host computer 110, after executing the SMI handler 178, the CPU 112 exits the SMM. Since the AML code 176 was in control of the CPU 112 before the SMM, at procedure 465, the control of the CPU 112 is now back to the AML code 176. In certain embodiments, the AML code 176 may not recognize whether the data transaction between the SP 120 and the host computer 110 has occurred or not.

At procedure 470, the AML code 176 checks the value of the flag register 177 to determine whether the data transaction has occurred or not. As described above, the SMI handler 178 has updated the value of the flag register 177 to indicate that the SP intends to initiate the data transaction. Thus, the AML code 176 may determine, based on the value of the flag register 177, that the data transaction has occurred. Since the OS 160 was in control of the CPU 112 before the AML code 176 takes over control, at procedure 480, the AML code 176 returns the control back to the OS 160.

It should be noted that in the procedures as depicted in FIGS. 4A and 4B, the SP 120 generates the power off command for the purpose of initiating the data transaction. Thus, no power off operation is performed.

Figure 5A:
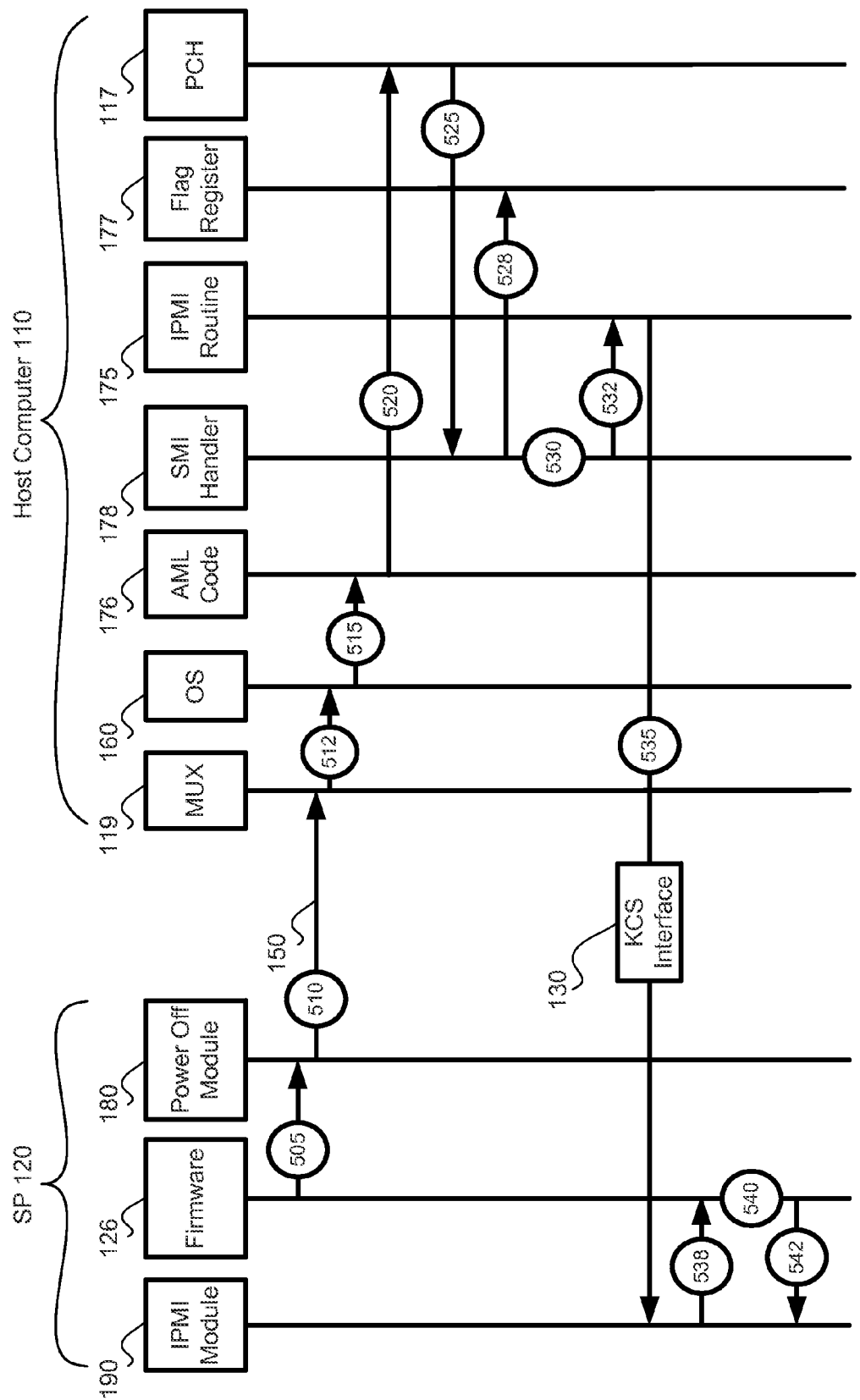
FIGS. 5A and 5B schematically depict the SP initiating data transaction from the SP to the BIOS of the host computer according to certain embodiments of the present disclosure.
Figure 5B:
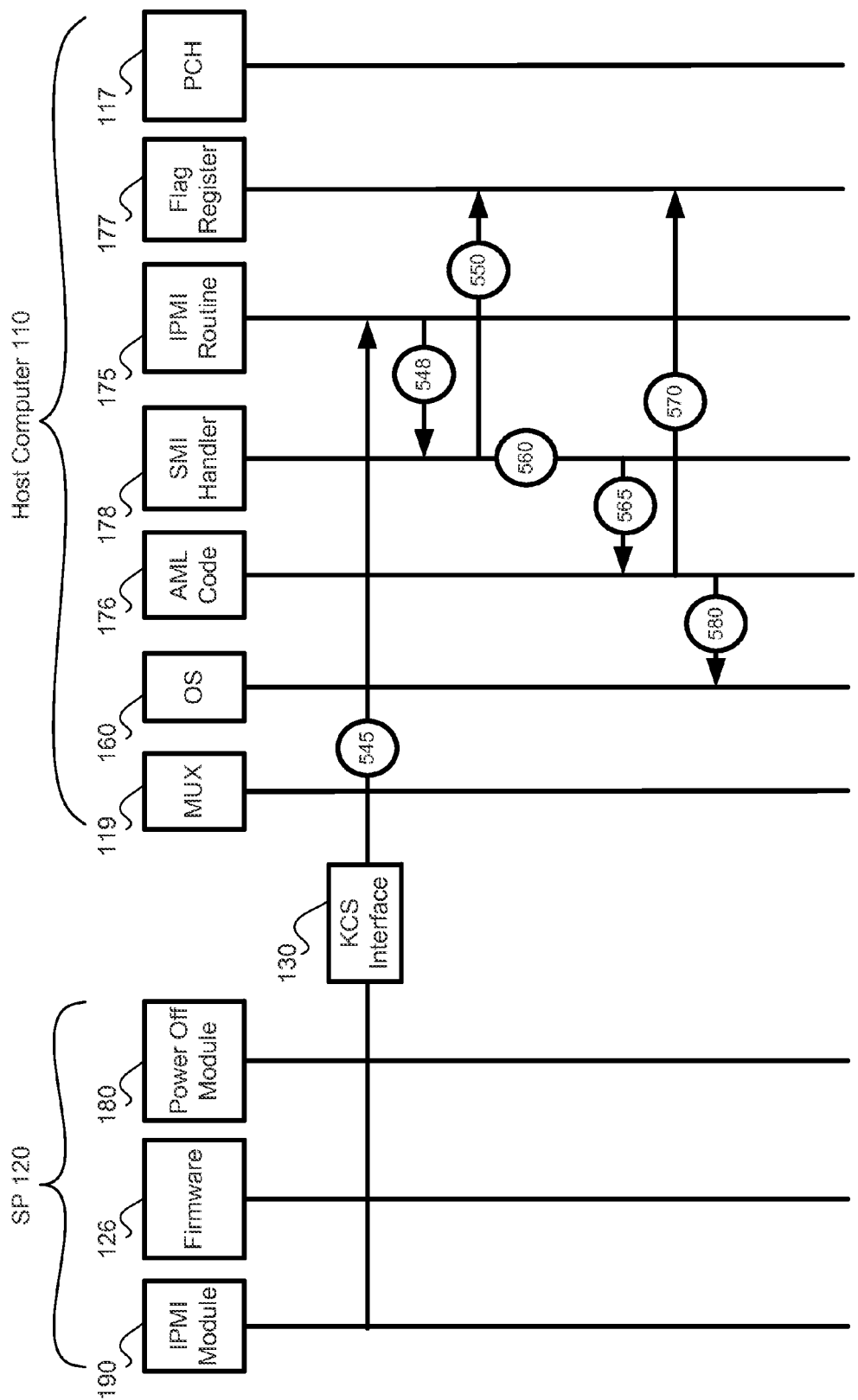

FIGS. 5A and 5B schematically depict the SP initiating data transaction from the SP to the BIOS of the host computer according to certain embodiments of the present disclosure. In certain embodiments, hardware SMI is used to trigger the SMI handler 178, and the data to be transferred between the SP 120 and the SMI handler 178 is the setting data of the BIOS 170 for updating the BIOS chip 116.

Referring to FIG. 5A, when the SP 120 intends to transfer certain data to the BIOS 170 of the host computer 110, the SP 120 may initiate the data transaction from the SP 120 to the host computer 110. At procedure 505, the firmware 126 instructs the power off module 180 to generate a power off command. At procedure 510, the power off module 180 of the SP 120, upon the instruction by the firmware 126, sends a power off command to the host computer 110 through the communication link 150.

At the host computer 110, when the MUX 119 receives the power off command from the SP 120, at procedure 512, the MUX 119 forwards the power off command to the OS 160, which is executed at the CPU 112. It should be noted that the OS 160 does not recognize whether the power off command is issued by the SP 120 or generated by pressing the power button 110 of the host computer 110.

Upon receiving the power off command, at procedure 515, the OS 160 executed at the CPU 112 may be triggered by the power off command to call the AML code 176, which is pre-stored in the memory 114 during the booting process, and the AML code 176 takes over control of the CPU 112 from the OS 160.

At procedure 520, the AML code 176, which is executed at the CPU 112, sends a signal to the PCH hardware 117 to write a value into the specific register of the PCH hardware 117 to generate a hardware SMI. When the value of the specific register is updated, at procedure 525, the PCH hardware 117 generates a hardware SMI to trigger the CPU 112 to enter SMM. Specifically, the PCH can send an interrupt signal to an SMI pin of CPU 112. In response to the SMI, the CPU enters SMM and executes the SMI handler 178, which is pre-stored in the SMRAM area 174 during the booting process.

Once taking over control of the CPU 112, the SMI handler 178 must determine whether the SP 120 intends to initiate data transaction or not. At procedure 528, the SMI handler 178 initiates a flag register 177 in the memory 114. The flag register 177 is a reserved register to indicate whether the SP 120 intends to initiate the data transaction or not, and the preset value for the flag register 177 indicate that the SP 120 does not intend to initiate the data transaction. In certain embodiment, for example, the value in the flag register 177 may be a first value to indicate that SP 120 intends to initiate the data transaction, or a second value to indicate that the SP 120 does not intend to initiate the data transaction. In this case, the preset value of the flag register 177 is the second value.

At procedure 530, the SMI handler 178 generates a notification for the SP 120. The notification may contain information notifying the SP 120 that the host computer 110 is now in the SMM, and asking whether the SP 120 intends to initiate the data transaction. At procedure 532, the SMI handler 178 sends the data of the notification to the IPMI routine 175 for processing. Upon receiving the data of the notification, the IPMI routine 175 converts the data of the notification to generate the IPMI OEM message, and at procedure 535, the IPMI routine 175 sends the IPMI OEM message representing the notification to the SP 120 through the KCS interface 130. It should be appreciated that the IPMI OEM message can be sent to the SP 120 through the USB interface 140 or any appropriate communication interfaces. In certain embodiments, the IPMI OEM message requests a response from the SP 120 to indicate whether it was the SP 120 that issued a power off command.

At procedure 538, the IPMI module 190 receives the IPMI OEM message representing the notification, converts the IPMI OEM message to generate the notification, which is recognizable by the firmware 126, and sends the notification to the firmware 126.

At procedure 540, in response to the notification, the firmware 126 generates a response to indicate whether it was the SP 120 that issued a power off command. At procedure 442, the firmware 126 sends the response to the IPMI module 190 for processing.

Referring to FIG. 5B, upon receiving the response, at procedure 545, the IPMI module 190 converts the response to generate another IPMI OEM message, and sends the IPMI OEM message representing the data transaction request to the host computer 110 through the KCS interface 130. It should be appreciated that the IPMI OEM message can be sent to the SP 120 through the USB interface 140 or any other communication interfaces. The IPMI OEM message indicates whether it was the SP 120 that issued the power off command.

At procedure 548, the IPMI routine 175 receives the IPMI OEM message representing the response, extracts the response from the IPMI OEM message. The SMI handler 178 can then determine whether it was the SP 120 that issued the power off command based on the response In response to a determination that it was the SP 120 that issued the power off command based on the response, at procedure 550, the SMI handler 178 updates the flag register 177 by writing a first value in the flag register 177 in the memory 114 to indicate that the SP 120 intends to initiate the data transaction.

In response to a determination that it was not the SP 120 that issued the power off command based on the response, the SMI handler 178 updates the flag register 177 by writing a second value in the flag register 177 in the memory 114 to indicate that SP 120 does not intend to initiate the data transaction as described above. In this situation, the SMI handler 178 can terminate and wait for the CPU to exit SMM. Alternatively, the SMI handler 178 may contain other pre-set routines such as those implementing Advanced Power Management (APM) features, and the SMI handler may enter and execute one or more of the other pre-set routines.

Then, at procedure 560, the SMI handler 178 can request data from the SP 120 and then process the received data (e.g., updating the setting data of the BIOS 170 by saving the data into the BIOS chip 116). Further, the SMI handler 178 can send data to the SP 120.

After processing with the data, the SMI handler 178 exits the SMM. Since the AML code 176 was in control of the CPU 112 before the SMM, at procedure 565, the control of the CPU 112 is now back to the AML code 176.

It should be noted that the AML code 176 may not recognize whether the data transaction between the SP 120 and the host computer 110 has occurred or not. At procedure 570, the AML code 176 checks the value of the flag register 177 to determine whether the data transaction has occurred or not. As described above, the SMI handler 178 has updated the value of the flag register 177 to indicate that the SP intends to initiate the data transaction. Thus, the AML code 176 may determine, based on the value of the flag register 177, that the data transaction has occurred. Since the OS 160 was in control of the CPU 112 before the AML code 176 takes over control, at procedure 580, the AML code 176 returns the control back to the OS 160.

It should be noted that in the procedures as depicted in FIGS. 5A and 5B, the SP 120 generates the power off command for the purpose of initiating the data transaction. Thus, no power off operation is performed.

The method as described in the embodiments of the present disclosure can be used in the field of, but not limited to, SP initiated data transaction between the BIOS and the SP utilizing the power off commands. When the SP intends to initiate a data transaction with the BIOS, the SP issues a power off command to the host computer. The OS, in response to the power off command, calls the AML code to enter the SMM, and the SMI handler may issue a notification to the SP such that the SP may perform data transaction in response to the notification.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a service processor (SP), comprising a processor, a non-volatile memory and a communication interface, wherein the non-volatile memory stores computer executable code configured to, when executed at the processor,
generate a first power off command, and send the first power off command to a host computer;
receive, via the communication interface, a first Intelligent Platform Management Interface (IPMI) original equipment manufacturer (OEM) message from a system management interface (SMI) handler executed under a system management mode (SMM) at a central processing unit (CPU) of the host computer; and
in response to the first IPMI OEM message, perform data transaction between the SP and the host computer by:
in response to the first IPMI OEM message, retrieving specific data stored in the SP, and generating a second IPMI OEM message comprising the specific data; and
sending, via the communication interface, the second IPMI OEM message to the SMI handler executed under the SMM at the CPU of the host computer,
wherein the host computer comprises:
the CPU;
a volatile memory, comprising a system management random access memory (SMRAM) area and a flag register;
a BIOS chip storing a basic input/output system (BIOS), an Advanced Configuration and Power Interface (ACPI) Machine Language (AML) code, and
the SMI handler; and
a storage device storing an operating system (OS);
wherein the BIOS, when executed at the CPU, is configured to
load the SMI handler into the SMRAM area;
load the AML code into the volatile memory; and
load the OS into the volatile memory, and execute the OS at the CPU;
wherein the OS, when executed at the CPU, is configured to
receive the first power off command or a second power off command; and
in response to receiving the first power off command or the second power off command, execute the AML code at the CPU;
wherein the AML code, when executed at the CPU, is configured to
generate a SMI to instruct the CPU to enter the SMM; and
check a value of the flag register in the memory to determine whether the OS received the first power off command or received the second power off command; and
wherein the SMI handler, when executed at the CPU, is configured to
generate the first IPMI OEM message, and send the first IPMI OEM message to the SP via the communication interface; and
perform the data transaction between the SP and the host computer, and update the value of the flag register to indicate that the OS received the first power off command.

2. The system as claimed in claim 1, wherein the communication interface is a standardized interface under an IPMI standard, wherein the standardized interface comprises a keyboard controller style (KCS) interface, a system management interface chip (SMIC) interface, and a block transfer (BT) interface.

3. The system as claimed in claim 1, wherein the SP is a baseboard management controller (BMC).

4. The system as claimed in claim 1, wherein the value of the flag register is selected from a first value indicating the OS received the first power off command and a second value indicating the OS received the second power off command.

5. The system as claimed in claim 1, wherein the AML code, when executed at the CPU, is further configured to
in response to determining the OS received the second power off command based on the value of the flag register, perform a power off operation based on the second power off command.

6. The system as claimed in claim 1, wherein the host computer further comprises a power button, wherein the second power off command is generated by pressing the power button.

7. The system as claimed in claim 1, wherein the SMI handler, when executed at the CPU, is configured to perform the data transaction by:
receiving, via the communication interface, the second IPMI OEM message from the SP; and
retrieving the specific data from the second IPMI OEM message.

8. A system, comprising:
a service processor (SP), comprising a processor, a non-volatile memory and a communication interface, wherein the non-volatile memory stores computer executable code configured to, when executed at the processor, generate a first power off command, and send the first power off command to a host computer;

receive, via the communication interface, a first Intelligent Platform Management Interface (IPMI) original equipment manufacturer (OEM) message from a system management interface (SMI) handler executed under a system management mode (SMM) at a central processing unit (CPU) of the host computer; and in response to the first IPMI OEM message, perform data transaction between the SP and the host computer by:

in response to the first IPMI OEM message, sending, via the communication interface, a data transaction request to the BIOS executed under the SMM at the CPU of the host computer; and receiving, via the communication interface, a response to the data transaction request from the SMI handler executed under the SMM at the CPU of the host computer, wherein the response comprises specific data requested by the data transaction request, wherein the host computer comprises:

the CPU;

a volatile memory, comprising a system management random access memory (SMRAM) area and a flag register;

a BIOS chip storing a basic input/output system (BIOS), an Advanced Configuration and Power Interface (ACPI) Machine Language (AML) code, and the SMI handler; and a storage device storing an operating system (OS);

wherein the BIOS, when executed at the CPU, is configured to load the SMI handler into the SMRAM area;

load the AML code into the volatile memory; and load the OS into the volatile memory, and execute the OS at the CPU;

wherein the OS, when executed at the CPU, is configured to receive the first power off command or a second power off command; and in response to receiving the first power off command or the second power off command, execute the AML code at the CPU;

wherein the AML code, when executed at the CPU, is configured to generate a SMI to instruct the CPU to enter the SMM; and check a value of the flag register in the memory to determine whether the OS received the first power off command or received the second power off command; and wherein the SMI handler, when executed at the CPU, is configured to generate the first IPMI OEM message, and send the first IPMI OEM message to the SP via the communication interface; and perform the data transaction between the SP and the host computer, and update the value of the flag register to indicate that the OS received the first power off command.

9. The system as claimed in claim 8, wherein the SMI handler, when executed at the CPU, is configured to perform the data transaction by:

receiving, via the communication interface, the data transaction request from the SP;

retrieving the specific data based on the data transaction request, and generate the response with the specific data; and sending, via the communication interface, the response to the SP.

10. The system as claimed in claim 9, wherein the data transaction request is a second IPMI OEM message, and the response is a third IPMI OEM message comprising the specific data.

11. A method of performing data transaction between a service processor (SP) and a host computer, comprising:

generating, by the SP, a first power off command, and sending the first power off command to the host computer;

loading, at the host computer, a basic input/output system (BIOS) from a BIOS chip of the host computer, and executing the BIOS at a central processing unit (CPU);

loading, by the BIOS executed at the CPU, a system management interface (SMI) handler from the BIOS chip into a system management random access memory (SMRAM) area into a volatile memory of the host computer;

loading, by the BIOS executed at the CPU, an Advanced Configuration and Power Interface (ACPI) Machine Language (AML) code from the BIOS chip into the volatile memory;

loading, by the BIOS executed at the CPU, an operation system (OS) stored in a storage device of the host computer into the volatile memory, and execute the OS at the CPU;

receiving, by the OS executed at the CPU, the first power off command or a second power off command;

in response to receiving the first power off command or the second power off command, executing the AML code at the CPU;

generating, by the AML code executed at the CPU, a SMI to instruct the CPU to enter a system management mode (SMM);

generating, by the SMI handler executed at the CPU, a first Intelligent Platform Management Interface (IPMI) OEM message, and sending the first IPMI OEM message to the SP via a communication interface;

receiving, at the SP via the communication interface, the first IPMI OEM message from the SMI handler executed under the SMM at the CPU of the host computer;

in response to the first IPMI OEM message, performing, by the SP, data transaction with the host computer by:

in response to the first IPMI OEM message, retrieving specific data stored in the SP, and generating a second IPMI OEM message comprising the specific data and sending, via the communication interface, the second IPMI OEM message to the SMI handler executed under the SMM at the CPU of the host computer;

performing, by the SMI handler executed at the CPU, the data transaction between the SP and the host computer, and updating a value of a flag register in the volatile memory to indicate that the OS received the first power off command; and checking, by the AML code executed at the CPU, a value of the flag register to determine whether the OS received the first power off command or received the second power off command.

12. The method as claimed in claim 11, further comprising:
in response to determining the OS received the second power off command based on the value of the flag register, performing, by the AML code executed at the CPU, a power off operation based on the second power off command.

13. The method as claimed in claim 11, wherein the value of the flag register is selected from a first value indicating the OS received the first power off command and a second value indicating the OS received the second power off command.

14. A non-transitory computer readable medium storing computer executable code, wherein the computer executable code, when executed at a processor of a service processor (SP), is configured to
generate, at the SP, a first power off command, and send the first power off command to a host computer;
receive, at the SP via a communication interface, a first Intelligent Platform Management Interface (IPMI) original equipment manufacturer (OEM) message from a system management interface (SMI) handler executed under a system management mode (SMM) at a central processing unit (CPU) of a host computer; and
in response to the first IPMI OEM message, perform, at the SP, data transaction with the host computer by:
in response to the first IPMI OEM message, retrieving specific data stored in the SP, and generating a second IPMI OEM message comprising the specific data; and
sending, via the communication interface, the second IPMI OEM message to the SMI handler executed under the SMM at the CPU of the host computer,
wherein the host computer comprises:
the CPU;
a volatile memory, comprising a system management random access memory (SMRAM) area and a flag register;
a BIOS chip storing a basic input/output system (BIOS), an Advanced Configuration and Power Interface (ACPI) Machine Language (AML) code, and the SMI handler; and
a storage device storing an operating system (OS);
wherein the BIOS, when executed at the CPU, is configured to
load the SMI handler into the SMRAM area
load the AML code into the volatile memory; and
load the OS into the volatile memory, and execute the OS at the CPU;
wherein the OS, when executed at the CPU, is configured to
receive the first power off command or a second power off command; and
in response to receiving the first power off command or the second power off command, execute the AML code at the CPU;
wherein the AML code, when executed at the CPU, is configured to
generate a SMI to instruct the CPU to enter the SMM; and
check a value of the flag register in the memory to determine whether the OS received the first power off command or received the second power off command; and
wherein the SMI handler, when executed at the CPU, is configured to
generate the first IPMI OEM message, and send the first IPMI OEM message to the SP via the communication interface; and
perform the data transaction between the SP and the host computer, and update the value of the flag register to indicate that the OS received the first power off command.

15. The non-transitory computer readable medium as claimed in claim 14, wherein the AML code, when executed at the CPU, is configured to perform a power off operation based on the power off command in response to determining the OS received the second power off command based on the value of the flag register,
wherein the value of the flag register is selected from a first value indicating the OS received the first power off command and a second value indicating the OS received the second power off command.

* * * * *